United States Patent
Quioc et al.

(10) Patent No.: US 7,275,760 B2
(45) Date of Patent: Oct. 2, 2007

(54) MULTI-CHAMBER GAS GENERATING SYSTEM

(75) Inventors: Eduardo L. Quioc, Westland, MI (US); Paresh S. Khandhadia, Troy, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/188,456

(22) Filed: Jul. 25, 2005

(65) Prior Publication Data

US 2006/0017270 A1    Jan. 26, 2006

Related U.S. Application Data

(60) Provisional application No. 60/590,474, filed on Jul. 23, 2004.

(51) Int. Cl.
*B60R 21/26* (2006.01)

(52) U.S. Cl. .................. 280/736; 280/741; 280/742

(58) Field of Classification Search ............ 280/741, 280/736, 737, 742; 102/530, 531
See application file for complete search history.

(56) References Cited

U.S. PATENT DOCUMENTS

| | | | |
|---|---|---|---|
| 2,891,525 A | 6/1959 | Moore ................ 123/90.51 |
| 4,001,750 A | 1/1977 | Scherer et al. ........... 337/280 |
| 4,215,631 A | 8/1980 | Rucker ................... 102/27 |
| 4,530,516 A | 7/1985 | Adams et al. ........... 280/741 |
| 4,611,374 A | 9/1986 | Schnelle et al. ........ 29/890.13 |
| 4,730,558 A | 3/1988 | Florin et al. ............ 102/218 |
| 4,762,067 A | 8/1988 | Barker et al. ........... 102/313 |
| 4,950,458 A | 8/1990 | Cunningham ........... 422/164 |
| 5,219,178 A * | 6/1993 | Kobari et al. ........... 280/736 |
| 5,308,370 A * | 5/1994 | Kraft et al. ............. 55/487 |
| 5,346,254 A | 9/1994 | Esterberg |
| 5,372,449 A | 12/1994 | Bauer et al. ............. 403/273 |
| 5,564,743 A | 10/1996 | Marchant ................ 280/741 |
| 5,582,427 A | 12/1996 | Rink et al. .............. 280/740 |
| 5,611,566 A | 3/1997 | Simon et al. ............ 280/736 |
| 5,622,380 A | 4/1997 | Khandhadia et al. ..... 280/736 |
| 5,628,528 A | 5/1997 | DeSautelle et al. ...... 280/736 |
| 5,630,619 A | 5/1997 | Buchanan et al. ........ 280/741 |
| 5,799,973 A | 9/1998 | Bauer et al. ............. 280/741 |
| 5,872,329 A | 2/1999 | Burns et al. |
| 5,934,705 A | 8/1999 | Siddiqui et al. ......... 280/736 |
| 5,941,562 A | 8/1999 | Rink et al. .............. 280/741 |
| 6,009,809 A | 1/2000 | Whang |

(Continued)

*Primary Examiner*—Ruth Ilan
(74) *Attorney, Agent, or Firm*—L.C. Begin & Associates, PLLC (57) ABSTRACT

A multi-chamber gas generating system (10) has a housing (12) with openings (24) formed in a wall thereof. A gas-tight internal divider (42) separates the housing into two chambers (80, 80'). A first gas generating sub-assembly (100) incorporating a baffle system is positioned in the first chamber (100). The sub-assembly (100) includes a first tubular member (44) and a second tubular member (52) positioned within the first member. The first and second members have openings (49, 54) formed therein to enable fluid communication between a combustion chamber of the sub-assembly and the housing openings (24). The first sub-assembly openings (49, 54) are axially displaced from the housing openings (24) such that combustion products flow in opposing first and second axial directions between the first sub-assembly combustion chamber and the housing openings. A second sub-assembly (100') of substantially identical construction is positioned in the housing second chamber (80').

17 Claims, 3 Drawing Sheets

U.S. PATENT DOCUMENTS

| | | |
|---|---|---|
| 6,019,389 A | 2/2000 | Burgi et al. ............... 280/736 |
| 6,032,979 A | 3/2000 | Mossi et al. ............... 280/741 |
| 6,074,502 A | 6/2000 | Burns et al. |
| 6,089,598 A * | 7/2000 | Snyder et al. ............ 280/740 |
| 6,095,556 A | 8/2000 | Bailey et al. ............. 280/737 |
| 6,095,561 A | 8/2000 | Siddiqui et al. ........... 280/472 |
| 6,149,193 A | 11/2000 | Canterberry et al. ....... 280/741 |
| 6,210,505 B1 | 4/2001 | Khandhadia et al. |
| 6,244,623 B1 | 6/2001 | Moore et al. ............. 280/741 |
| 6,464,254 B2 | 10/2002 | Chikaraishi et al. ....... 280/741 |
| 6,485,051 B1 * | 11/2002 | Taguchi et al. ........... 280/736 |
| 6,607,214 B2 | 8/2003 | Blakemore et al. |
| 6,871,873 B2 | 3/2005 | Quioe et al. ............... 280/741 |
| 6,913,284 B2 | 7/2005 | Haeuslmeier et al. ...... 280/735 |
| 2004/0195813 A1 * | 10/2004 | Canterberry et al. ....... 280/741 |
| 2005/0001414 A1 | 1/2005 | Matsuda et al. ........... 280/736 |
| 2005/0134031 A1 | 6/2005 | McCormick |
| 2005/0161923 A1 | 7/2005 | Hirooks et al ............. 280/774 |
| 2005/0161925 A1 | 7/2005 | Blackburn ................. 280/741 |
| 2005/0194772 A1 | 9/2005 | Numoto et al. ............ 280/741 |
| 2005/0230949 A1 | 10/2005 | Blackburn |

* cited by examiner

MULTI-CHAMBER GAS GENERATING SYSTEM

CROSS REFERENCE TO RELATED APPLICATIONS

This application claims the benefit of provisional application Ser. No. 60/590,474, filed on Jul. 23, 2004.

BACKGROUND OF THE INVENTION

The present invention relates generally to gas generating systems and, more particularly, to gas generating systems for use in applications such as inflatable occupant restraint systems in motor vehicles.

Gas generating systems used for deploying an air bag in a motor vehicle generally employ a single gas generator in fluid communication with an uninflated air bag. The gas generator is typically triggered by a firing circuit when the sensed vehicle acceleration exceeds a predetermined threshold value, as through the use of an acceleration-responsive inertial switch.

An ongoing challenge is to improve the kinematics of the occupant during a crash event by tailoring the onset/pressurization inflation rate of the airbag. To that end, dual or multiple chamber inflators have been developed.

For example, a gas generating system may include two chambers in a single housing defined by a mechanically retained wall or barrier between the ends thereof. Each chamber is of a predetermined size that is determinative of the propellant capacity and consequently, of the inflating capability of the chamber. Upon the occurrence of a vehicle collision, depending on the weight of the passenger, either chamber or both chambers may be selectively ignited thereby inflating the protective airbag. However, it is important to ensure that the wall remains in position within the housing when only one chamber is fired.

It is also important to efficiently cool and filter generated gases prior to their diffusion into an associated airbag or other inflatable device.

In addition, in gas generating systems using elongated housings, proper alignment and securement of concentric longitudinal components within the housing during assembly can be time-consuming.

Therefore, a need exists for an easily manufacturable multi-chamber gas generating system which provides adequate cooling of generated gases prior to disbursement, and which can produce selective air bag inflation pressurization yet prevent hazardous structural failure of the gas generator.

SUMMARY OF THE INVENTION

The present invention provides a multi-chamber gas generating system comprising an elongated housing including a housing wall and a divider secured within an interior of the housing to separate the interior of the housing into a first chamber and a second chamber. The divider forms a gas-tight barrier between the chambers. At least one opening is formed in the housing wall to enable fluid communication between the first chamber and an exterior of the housing. At least one opening is also formed in the housing wall to enable fluid communication between the second chamber and the exterior of the housing. A first tubular member is positioned within the first housing chamber, the first tubular member having at least one opening formed therein to enable fluid communication between an interior of the first tubular member and the opening formed in the housing wall enabling fluid communication between the first chamber and the housing exterior. A second tubular member is positioned within the first tubular member, the second tubular member including at least one opening formed therein to enable fluid communication between an interior of the second tubular member and the opening formed in the first tubular member. The housing wall opening enabling fluid communication between the first chamber and the housing exterior is axially displaced from the opening in the first tubular member such that combustion products flow in a first axial direction between the opening in the first tubular member and the housing wall opening. Also, the opening in the first tubular member is axially displaced from the opening in the second tubular member such that combustion products flow in a second axial direction between the opening in the second tubular member and the opening in the first tubular member, the second axial direction being substantially opposite from the first axial direction.

A third tubular member is positioned within the second housing chamber, the third tubular member having at least one opening formed therein to enable fluid communication between an interior of the third tubular member and the opening formed in the housing wall enabling fluid communication between the second chamber and the housing exterior. Also, a fourth tubular member is positioned within the third tubular member, the fourth tubular member including at least one opening formed therein to enable fluid communication between an interior of the fourth tubular member and the opening formed in the third tubular member. The housing wall opening enabling fluid communication between the second chamber and the housing exterior is axially displaced from the opening in the third tubular member such that combustion products flow in the second axial direction between the opening in the third tubular member and the housing wall opening. In addition, the opening in the third tubular member is axially displaced from the opening in the fourth tubular member such that combustion products flow in the first axial direction between the opening in the fourth tubular member and the opening in the third tubular member. The first and second tubular members being positioned within the first chamber, and the third and fourth tubular members being positioned within the second chamber.

DETAILED DESCRIPTION

Figure 1:
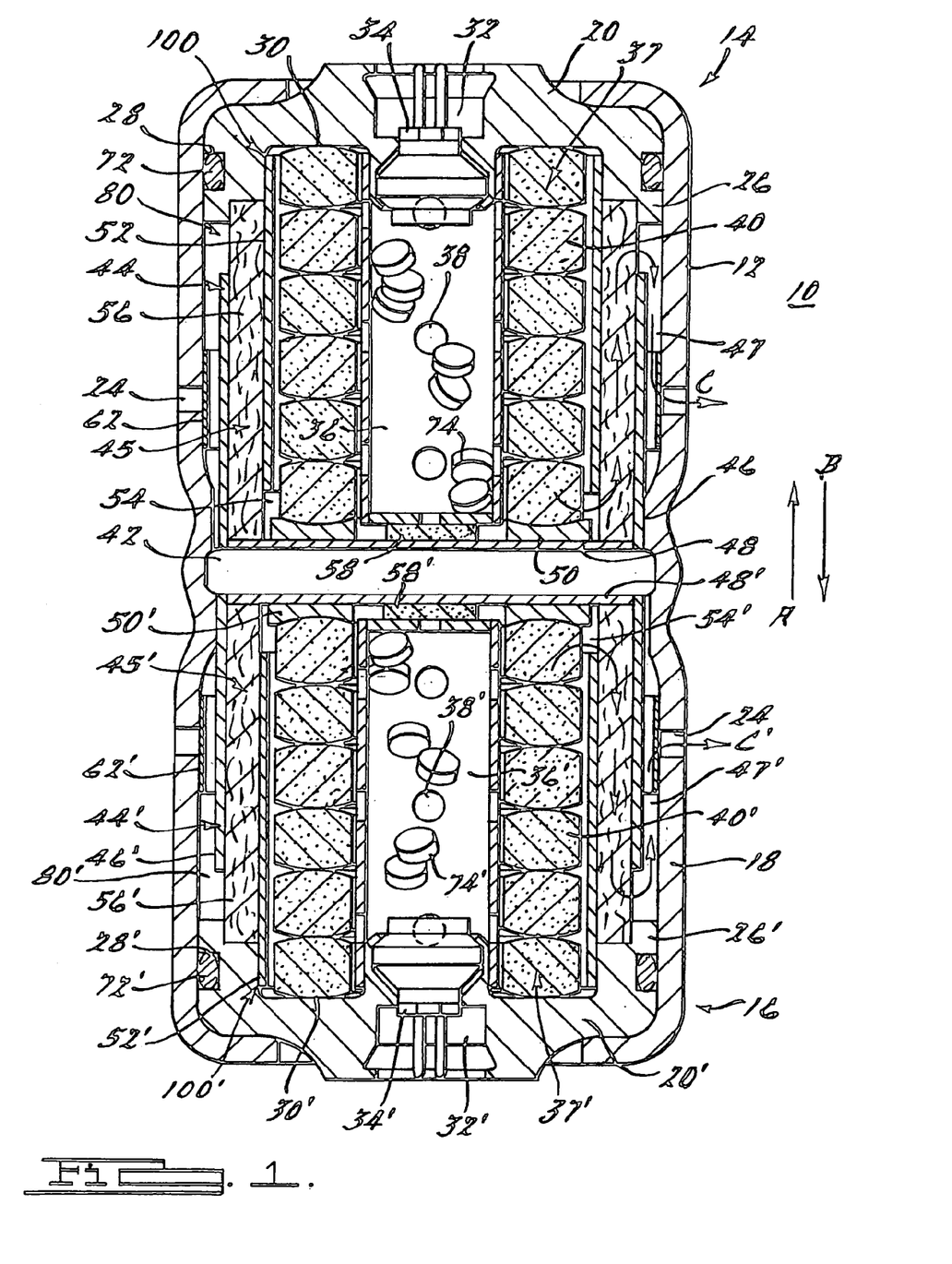
FIG. 1 is a cross-sectional side view of an embodiment of a gas generating system in accordance with the present invention.

FIG. 1 shows a multi-chamber gas generating system 10 including an elongated cylindrical housing member 12 having a pair of opposed ends 14, 16 and a housing wall 18 defining an enclosure. Housing member 12 may be a cast, stamped, extruded, or otherwise metal-formed. At least one (and preferably a plurality) of gas exit orifices 24 are formed in housing member wall 18 to permit fluid communication between the housing enclosure and an exterior of the housing.

An imperforate chamber divider 42 is secured within housing member 12 intermediate housing ends 14 and 16. Divider 42 is roll-crimped or otherwise secured within housing member 12 so as to form a gas-tight seal between divider 42 and housing wall 18, and to maintain the divider in its position within the housing when the divider is subjected to pressures generated by combustion of gas generants stored within the housing. Chamber divider 42 divides the interior of housing 12 into a pair of independently operable first and second gas generation chambers, 80 and 80' respectively. Divider 42 is preferably formed from a metallic, ceramic, or other flame-resistant material.

Figure 2:
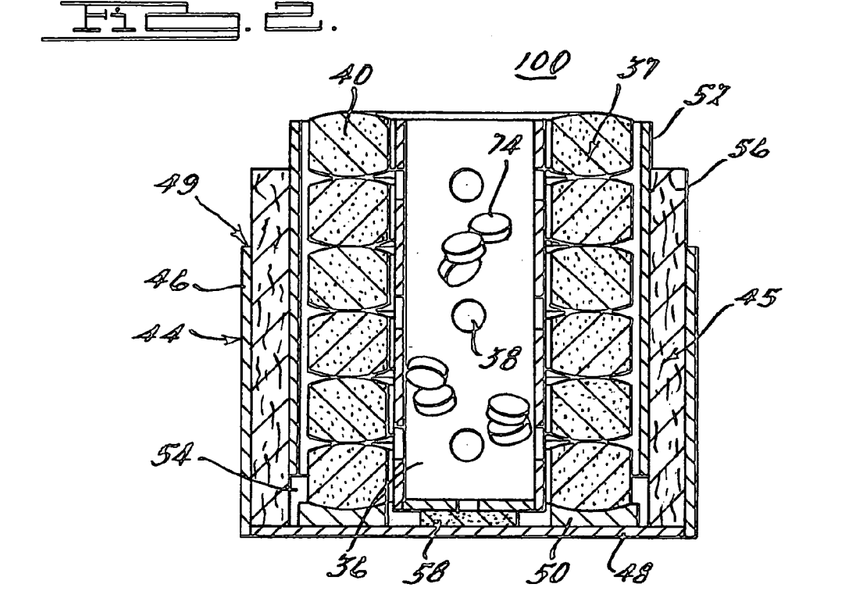
FIG. 2 is a cross-sectional side view of an embodiment of a gas generating system sub-assembly in accordance with the present invention.

Referring to FIGS. 1 and 2, the majority of the internal components of gas generating system 10 are incorporated into a gas generating system sub-assembly, generally designated 100, which is insertable into either end of housing member 12 as a single unit, thereby simplifying assembly of the gas generating system. In the following description, the constituents and fabrication of a single sub-assembly 100 (positioned in first chamber 80) will be described. However, it will be understood that the internal components and the arrangement of components positioned in each of sub-assemblies 100 and 100' are in one embodiment substantially the same, and that a sub-assembly constructed as described below is positionable in either or both of chambers 80 and 80'. Thus, components in sub-assembly 100' that are similar to components in sub-assembly 100 have similar element numbers.

Accordingly, although not necessarily thereby limited, in the embodiment shown in FIGS. 1 and 2, similar components in each of sub-assemblies 100 and 100' are substantially identical. For example, first tubular member 44', second tubular member 52', and inner member 36' positioned within second chamber 80' are substantially identical to first tubular member 44, second tubular member 52, and inner member 36 positioned within first chamber 80, and may be formed with the same dimensions and using the same manufacturing processes.

Referring to FIGS. 1 and 2, a cup-shaped first tubular member 44 is positioned within housing member 12 abutting chamber divider 42. First tubular member 44 has a base 48 and a wall 46 extending from the periphery of the base to define therein an enclosure. Wall 46 also defines a first cavity 47 extending between the first tubular member and housing wall 18. The enclosure defined by base 48 and wall 46 has at least one opening formed therein to permit insertion of additional components of the gas generating system therein and to enable fluid communication between the first tubular member enclosure and first cavity 47, as described below. In the embodiment shown in FIGS. 1 and 2, the first tubular member enclosure has an opening 49 formed at an end thereof opposite base 48. First tubular member 44 may be formed from a metal or metal alloy by deep drawing, by rolling or extruding wall 46 and welding or otherwise attaching the wall to a stamped base 48, or by using any of a variety of other suitable metal forming processes.

Referring again to FIGS. 1 and 2, a second tubular member 52 defines an enclosure therein. Second tubular member 52 is positioned within the enclosure defined by first tubular member 44 to define a second cavity 45 extending between second tubular member 52 and first tubular member wall 46. In addition, at least one opening (and preferably a plurality of openings) 54 is formed in second tubular member 52 to enable fluid communication between the second tubular member enclosure and second cavity 45. In the embodiment shown in FIGS. 1 and 2, openings 54 are formed along an end portion of second tubular member 52 positioned adjacent first tubular member base 48. Second tubular member 52 may be formed from a metal or metal alloy by rolling, extrusion, or any other suitable metal forming method or methods.

Referring again to FIGS. 1 and 2, a permeable cooling element, generally designated 56, is positioned in second cavity 45 between second tubular member orifices 54 and opening 49 of first tubular member 44 for cooling and filtering combustion products flowing between second tubular member orifices 54 and the open end of first tubular member 44. As used herein, the term "permeable" refers to an element having openings that permit liquids or gases to pass through the element. Generally, cooling element 56 is substantially coextensive with second tubular member 52 and may be provided in any one of several forms. For example, in the embodiment shown in FIGS. 1 and 2, the cooling element is in the form of a conventional metallic mesh filter element. Although not limited thereby, U.S. Pat. Nos. 6,032,979 and 5,727,813, incorporated herein by reference, illustrate typical mesh filters suitable for the application described. Suitable metallic mesh is readily obtainable from suppliers such as Wayne Wire, Inc., of Kailcaska, Mich. In another embodiment, shown schematically in FIG. 4, the cooling element comprises a plurality of cylindrical baffle members substantially concentrically arranged to define an associated plurality of baffle chambers for directing a flow of combustion products between second tubular member orifices 54 and opening 49 of first tubular member 44.

Referring again to FIGS. 1 and 2, a tubular inner member 36 defining an enclosure therein is positioned within the enclosure defined by second tubular member 52 to define a third cavity 37 extending between second tubular member 52 and inner member 36. Inner member 36 includes at least one orifice (and preferably a plurality of orifices) 38 formed therein to enable fluid communication between the enclosure defined by inner member 36 and third cavity 37. Inner member 36 may be formed from a metal or metal alloy by rolling, extrusion, or any other suitable metal forming method or methods.

A first ignition or booster compound 74 is provided within the enclosure defined by inner member 36 in first chamber 80. A second ignition compound 74' is provided within the enclosure defined by a second inner member 36' positioned in second chamber 80'. Second ignition compound 74' within second inner member 36' may have the same composition or a composition different from ignition compound 74 provided within first inner member 36. Ignition compounds 74, 74' within inner members 36 and 36' are formulated as known in the art to produce flames upon ignition which flow out of the inner members through orifices 38 and 38' to ignite respective gas generant blocks 40 and 40' (described in greater detail below).

Referring again to FIGS. 1 and 2, an end portion of inner member 36 rests upon on a cushion or pad 58 abutting base 48 of first tubular member 44. Pad 58 serves to cushion ignition compound 74 positioned in inner member 36 against vibration and impact and may be formed from, for example, a ceramic fiber material.

Referring again to FIGS. 1 and 2, a first primary propellant or gas generant block 40 extends along third cavity 37 about an exterior of inner member 36, adjacent to and substantially coextensive with the perforated walls of inner member 36. First gas generant block 40 may comprise, for example, a plurality of annular wafers stacked and secured together. Orifices 38 in inner member 36 enable fluid communication between the enclosure defined by the inner member and first gas generant block 40. Correspondingly, in second chamber 80', a second primary propellant or gas generant block 40' extends along third cavity 37' about an exterior of first inner member 36', adjacent to and substantially coextensive with the perforated walls of member 36'. The second gas generant block 40' within second chamber 80' may have the same composition or a composition different from first gas generant block 40 provided within first chamber 80.

Gas generant blocks 40 and 40' may be formed from any known gas generant composition useful for airbag application and is exemplified by, but not limited to, compositions and processes described in U.S. Pat. Nos. 5,035,757, 5,872,329, 6,074,502, 6,210,505, or 6,620,266, all herein incorporated by reference.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

It should be noted that either the oxidizer or the fuel can act as a low-temperature slag former if it contains a suitable substance which can be converted during combustion. For example, sodium nitrate or the sodium salt of tetrazole, during the combustion reactions, can convert to sodium carbonate or sodium silicate, if silicon dioxide is also present.

Set in the above context, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Preferred high nitrogen nonazides employed as primary fuels in gas generant compositions include, in particular, amine salts of tetrazole and triazole selected from the group including monoguanidinium salt of 5,5'-Bis-1H-tetrazole (BHT•1GAD), diguanidinium salt of 5,5'-Bis-1H-tetrazole (BHT•2GAD), monoaminoguanidinium salt of 5,5'-Bis-1H-tetrazole (BHT•1AGAD), diaminoguanidinium salt of 5,5'-Bis-1H-tetrazole (BHT•2AGAD), monohydrazinium salt of 5,5'-Bis-1H-tetrazole (BHT•1HH), dihydrazinium salt of 5,5'-Bis-1H-tetrazole (BHT•2HH), monoammonium salt of 5,5'-bis-1H-tetrazole (BHT•1NH.sub.3), diammonium salt of 5,5'-bis-1H-tetrazole (BHT•2NH$_3$), mono-3-amino-1,2,4-triazolium salt of 5,5'-bis-1H-tetrazole (BHT•1ATAZ), di-3-amino-1,2,4-triazolium salt of 5,5'-bis-1H-tetrazole (BHT•2ATAZ), diguanidinium salt of 5,5'-Azobis-1H-tetrazo ABHT-2GAD), and monoammonium salt of 5-Nitramino-1H-tetrazole (NAT-1NH$_3$). The nonazide fuel generally comprises 15–65%, and preferably comprises 20–55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85–90% AN and 10–15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1–10% of the gas generant composition, wherein toxic effluents generated upon combustion are minimized. Other known gas generant constituents may be included within the gas generant composition to vary the performance of the gas generant.

An end portion of gas generant block 40 rests upon on a cushion or pad 50 abutting base 48 of first tubular member 44. Pad 50 serves to cushion the gas generant block against vibration and impact and may be formed from, for example, a ceramic fiber material.

Referring to FIG. 1, a first cap 20 is secured to end 14 of the housing member using one or more known methods. In FIG. 1, end 14 of housing member 12 is crimped over portions of first cap 20 to secure the cap within the housing member. First cap 20 has formed therein a peripheral shoulder 26, a peripheral cavity 28, a central cavity 30, and a central orifice 32 for receiving end portions of the gas generator components therein. A first igniter 34 is secured in central orifice 32 of first cap 20 and extends into inner member 36 when cap 20 is assembled to housing 12, so as to enable fluid communication between the igniter and the enclosure defined by inner member 36 containing first ignition compound 74. A first O-ring or seal 72 seals the interface between first cap 20 and housing member wall 18. First igniter 34 may be secured in central orifice 32 by the use of crimping, fasteners, welding, or other known methods. Igniter 34 may be formed as known in the art. One exemplary igniter construction is described in U.S. Pat. No. 6,009,809, herein incorporated by reference.

A second cap 20' and igniter 34', of a construction similar to those just described, are secured to an opposite end 16 of housing member 12. A second O-ring or seal 72' seals the interface between second cap 20' and housing member wall 18.

Assembly of the gas generating system will now be discussed with reference to FIGS. 1 and 2. It is noted that both chambers of the gas generating system may be assembled in the same fashion.

Referring to FIG. 1, to assemble gas generator 10, chamber divider 42 is positioned and secured within housing member 12 using, for example, a dual crimp as shown in FIG. 1. Burst shims 62, comprising for example, an aluminum sealing tape or other known mechanism, may then be provided to cover apertures 24 in housing member 12 prior to installation of the remaining components, thereby sealing the interior of the housing.

Second tubular member 52, inner member 36, cooling element 56, pads 50 and 58, gas generant composition 40, and ignition compound 74 (within inner member 36) are positioned within first tubular member 44 as previously described to form sub-assembly 100. The pre-loaded first tubular member is then inserted into end 14 of housing 12 into first chamber 80. Following placement of the pre-loaded first tubular member into housing 12, cap 20 is positioned and secured to the housing. As cap 20 is placed within the housing, an end portion of cooling element 56 resides within circumferential shoulder 26 formed in first cap 20, and an end portion of first gas generant block 40 is received in central cavity 30 formed in first cap 20. End portion 14 of housing 12 is then crimped over cap 20 to secure the gas generator system components in position and to form a gas tight seal.

Similarly, a fourth tubular member 52', inner member 36', cooling element 56', pads 50' and 58', gas generant composition 40', and ignition compound 74' (within inner member 36') are positioned within a third tubular member 44' as described above to form sub-assembly 100'. The pre-loaded third tubular member is then inserted into end 16 of housing 12 into second chamber 80'. Following placement of the pre-loaded first tubular member into housing 12, cap 20' is positioned and secured to the housing. As cap 20' is placed within the housing, an end portion of cooling element 56' resides within circumferential shoulder 26' formed in first cap 20', and an end portion of first gas generant block 40' is received in central cavity 30' formed in first cap 20'. End portion 16 of housing 12 is then crimped over cap 20 to secure the gas generator system components in position and to form a gas tight seal. As seen from FIG. 1, when sub-assembly 100 and sub-assembly 100' are positioned within housing 12 as shown in FIG. 1, sub-assemblies 100 and 100' are oriented with respect to divider 42 such that the orientation of sub-assembly 100' is inverted with respect to divider 42 from the orientation of sub-assembly 100. Stated another way, sub-assembly 100 presents a mirror image of sub-assembly 100' with respect to divider 42, and vice versa.

FIG. 1 shows a flow path of combustion products (along arrow C) through the gas generating system, between third cavity 37 containing gas generant composition 40 and housing wall gas exit orifices 24. A baffle system is incorporated into the structure of the gas generating system to aid in cooling generated gases prior to their disbursement. More specifically, a first baffle assembly is formed in chamber 80 by first tubular member 44 and second tubular member 52 comprising part of sub-assembly 100. As seen in FIG. 1, second tubular member orifices 54 are axially displaced from the opening 49 of first tubular member enclosure 44 such that a flow of combustion products entering second cavity 45 through orifices 54 is directed along the second cavity in a first axial direction (indicated by arrow A) toward opening 49 of first tubular member 44. In addition, housing wall orifices 24 are axially displaced from opening 49 of first tubular member 44 such that a flow of combustion products entering first cavity 47 through the first tubular member open end is directed along first cavity 47 in a second axial direction (indicated by arrow B) toward housing wall orifices 24, direction B being substantially opposite from direction A, thereby providing a tortuous path for flow of combustion products between the second tubular member orifices 54 and housing wall orifices 24.

Similarly, FIG. 1 shows a flow path of combustion products (along arrow C') through the gas generating system, between third cavity 37 containing gas generant composition 40 and housing wall gas exit orifices 24. A second baffle assembly is formed in second chamber 80' by third tubular member 44' and fourth tubular member 52' comprising part of sub-assembly 100'. As seen in FIG. 1, fourth tubular member orifices 54' are spaced apart from the opening 49' of third tubular member enclosure 44' such that a flow of combustion products entering second cavity 45' through orifices 54' is directed along the second cavity in direction B toward opening 49' of first tubular member 44'. In addition, housing wall orifices 24' are spaced apart from opening 49' of third tubular member 44' such that a flow of combustion products entering first cavity 47' through the third tubular member open end is directed along first cavity 47' in direction A toward housing wall orifices 24, thereby providing a tortuous path for flow of combustion products between the fourth tubular member orifices 54' and housing wall orifices 24.

Certain embodiments of the gas generating system described herein provides several advantages over known designs. The structure of cup-shaped first tubular members 44 and 44' enable the interior components of the gas generating system to be pre-loaded or pre-positioned therein to form sub-assemblies which are insertable into either of opposite ends of housing member 12 as single units. This substantially simplifies assembly of the gas generating system. The structure of each sub-assembly also defines a baffle assembly for cooling and filtering combustion products generated during combustion of the gas generant compositions, while sustaining the flame generated by combustion of the gas generants. The baffle assemblies, in conjunction with cooling members 56 and 56', also aid in preventing the escape of undesirable combustion products from housing member 12 during activation of the gas generating system.

As may be seen in FIG. 1, chamber divider 42 divides the interior of housing 12 into a pair of adjacent, yet separate chambers. Therefore, chamber divider 42 functions as a heat and pressure shield to prevent inadvertent or undesirable ignition of an ignition compound (or gas generant block) in one of chambers 80, 80' due to flame front, gas, and heat propagation resulting from combustion of the ignition compound (or other gas generant block) in the other one of chambers 80, 80'. Each chamber is operative independently from the other chamber, based on factors such as crash severity, occupant position sensing, and the weight and/or height of the occupant. It will be appreciated, however, that the chambers may be operated simultaneously, individually, or within a timed interval of each other. Thus, chamber divider 42 thus preserves independent operation of each chamber but does not inhibit or delay the simultaneous operation of each chamber if desired.

In the embodiment shown in FIG. 1, divider 42 is spaced substantially evenly from housing first and 14 and housing second end 16, thereby forming chambers 80 and 80' of substantially equal length and volume. However, it is noted that divider 42 may be positioned at any desired point along the length of housing 12 to provide adjacent chambers having substantially different lengths. Correspondingly, the respective length dimensions of first tubular members 44 and 44', second tubular members 52 and 52', cooling elements 58 and 58', and the other components may be adjusted to accommodate a variety of chamber lengths, thereby enabling independently operable gas generating chambers having different gas generation capacities according to particular design requirements.

Figure 3:
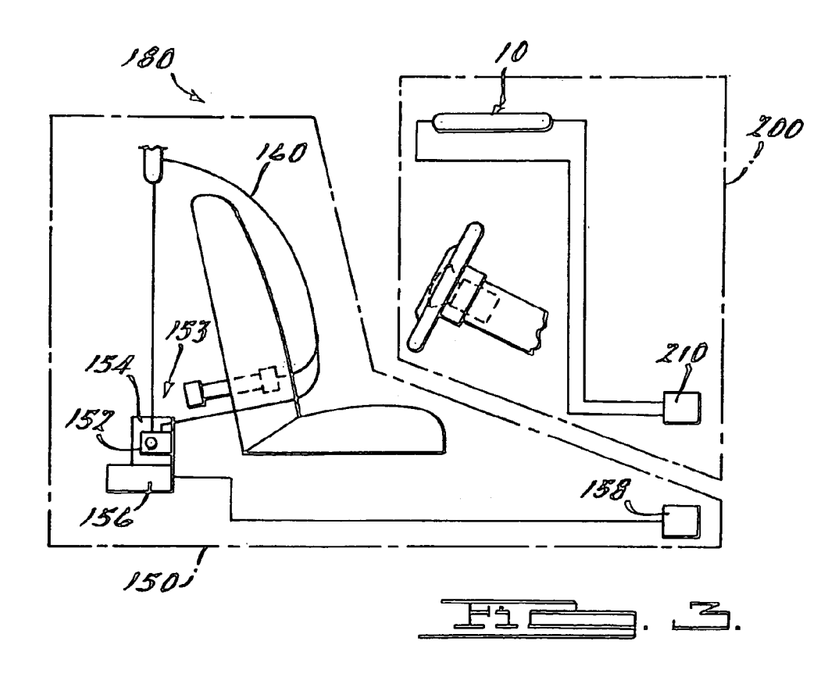
FIG. 3 is a schematic representation of a vehicle occupant restraint system incorporating a gas generating system in accordance with the present invention.

Referring to FIG. 3, in a particular application, a multi-chamber gas generating system in accordance with the present invention is incorporated into an airbag system. Airbag system 200 includes at least one airbag (not shown) and a gas generating system 10 as described herein coupled to the airbag so as to enable fluid communication with an interior of the airbag. Airbag system 200 may also be in communication with a known crash event sensor 210 that is in operative communication with a known crash sensor algorithm (not shown) which signals actuation of airbag system 200 via, for example, activation of gas generating system igniters 34 and/or 34' (not shown in FIG. 3) in the event of a collision.

Referring again to FIG. 3, an embodiment of the gas generating system or an airbag system including an embodiment of the gas generating system may be incorporated into a broader, more comprehensive vehicle occupant protection system 180. Chambers 80 and 80' of gas generating system may be coupled to a single airbag so as to provide differing levels of inflation pressure as required for particular applications. Alternatively, each of chambers 80 and 80' may be coupled to different airbags or other inflatable elements of the vehicle occupant protection system 180 for providing inflation gases thereto. For example, vehicle occupant protection system 180 may include elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

Figure 4:
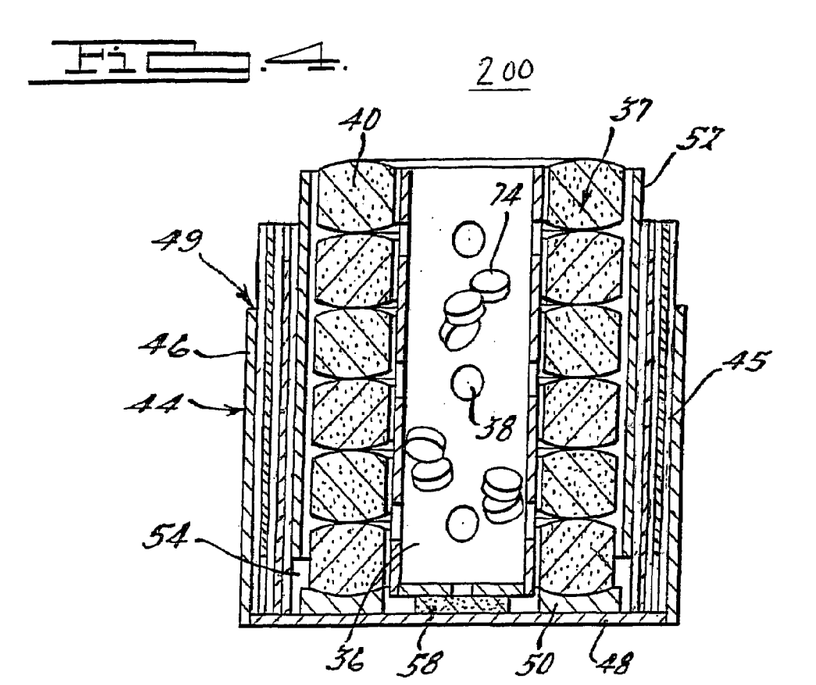
FIG. 4 is a cross-sectional side view of another embodiment of a gas generating system sub-assembly in accordance with the present invention.

In yet another aspect of the invention, as shown in FIG. 1, the present invention may be described as a multiple chamber gas generating system containing a first subassembly 100 including a first tubular member 44, a second tubular member 52 positioned within the first tubular member. and a first propellant chamber within the second tubular member. A first initiator assembly 34 is in operable communication with the first propellant chamber for initiating combustion of a gas generant positioned 38 within the first propellant chamber. The gas generating system also includes a second subassembly 100' containing a third tubular member 44', a fourth tubular member 52' positioned within the third tubular member, and a second propellant chamber within the fourth tubular member. A second initiator 34' assembly is in operable communication with the second propellant chamber for imtiating combustion of a gas generant 38' positioned within the second propellant chamber. The first and second tubular members 44, 52 combine to produce axial flow of eases initially in one of a first direction and a second direction substantially opposite the first direction, and subsequently in the other one of the first direction and the second direction, upon activation of said first propellant chamber. The third and fourth tubular members 44', 52' combine to produce axial flow of eases initially in one of the first direction and the second direction, and subsequently in the other one of the first direction and the second direction, upon activation of the second propellant chamber. The first and second subassemblies are substantially identical in design and are coaxially positioned within the gas generating system. In essence, as positioned within the gas generating system shown in the exemplary embodiment of FIG. 1, each subassembly represents a mirror image of the other. In a particular embodiment, the multiple chamber gas generating system may contain first and second cooling elements that are typified by first and second baffle assemblies formed by a plurality of concentric tubular members positioned between the first and second tubular members and between the third and fourth tubular members, respectively. FIG. 4 schematically shows an embodiment of a sub-assembly 200 incorporating a system of concentive baffles.

It will be appreciated that the various constituents described above are formed in known manners. For example, the baffles and various chambers may be molded, stamped or otherwise metal formed from carbon steel, aluminum, metallic alloys, or polymeric equivalents.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A multi-chamber gas generating system comprising:
an elongated housing including a housing wall;
a divider secured within an interior of the housing to separate the interior of the housing into a first chamber and a second chamber, the divider forming a gas-tight barrier between the chambers,
at least one opening formed in the housing wall to enable fluid communication between the first chamber and an exterior of the housing;
at least one opening formed in the housing wall to enable fluid communication between the second chamber and the exterior of the housing;
a first tubular member positioned within the first housing chamber, the first tubular member having at least one opening formed therein to enable fluid communication between an interior of the first tubular member and the at least one opening formed in the housing wall enabling fluid communication between the first chamber and the housing exterior;
a second tubular member positioned within the first tubular member, the second tubular member including at least one opening formed therein to enable fluid communication between an interior of the second tubular member and the at least one opening formed in the first tubular member, the at least one housing wall opening enabling fluid communication between the first chamber and the housing exterior being axially displaced from the at least one opening in the first tubular member such that combustion products flow in one of a first axial direction and a second axial direction between the at least one opening in the first tubular member and the at least one housing wall opening, the at least one opening in the first tubular member being axially displaced from the at least one opening in the second tubular member such that combustion products flow in the other one of the first axial direction and the second axial direction between the at least one opening in the second tubular member and the at least one opening in the first tubular member, the second axial direction being substantially opposite from the first axial direction;

a third tubular member positioned within the second housing chamber, the third tubular member having at least one opening formed therein to enable fluid communication between an interior of the third tubular member and the at least one opening formed in the housing wall enabling fluid communication between the second chamber and the housing exterior;

a fourth tubular member positioned within the third tubular member, the fourth tubular member including at least one opening formed therein to enable fluid communication between an interior of the fourth tubular member and the at least one opening formed in the third tubular member, the at least one housing wall opening enabling fluid communication between the second chamber and the housing exterior being axially displaced from the at least one opening in the third tubular member such that combustion products flow in one of the first axial direction and the second axial direction between the at least one opening in the third tubular member and the at least one housing wall opening, the at least one opening in the third tubular member being axially displaced from the at least one opening in the fourth tubular member such that combustion products flow in the other one of the first axial direction and the second axial direction between the at least one opening in the fourth tubular member and the at least one opening in the third tubular member, the first and second tubular members being positioned within the first chamber, and the third and fourth tubular members being positioned within the second chamber.

2. The gas generating system of claim 1 wherein the first tubular member includes a base portion positioned proximate the divider, the at least one second tubular member opening is formed in an end portion of the second tubular member, and wherein the end portion of the second tubular member is positioned adjacent the first tubular member base portion.

3. The gas generating system of claim 1 further comprising a cooling element positioned between the at least one second tubular member opening and the at least one first tubular member opening for cooling combustion products flowing therebetween.

4. The gas generating system of claim of claim 3 wherein the cooling element comprises a metallic mesh filter.

5. The gas generating system of claim 1 further comprising a tubular inner member positioned within the second tubular member, the tubular inner member including at least one opening formed therein to enable fluid communication between an interior of the tubular inner member and the at least one opening formed in the second tubular member.

6. The gas generating system of claim 5 further comprising a gas generant composition positioned between the second tubular member and the tubular inner member.

7. The gas generating system of claim 5 further comprising an ignition compound positioned within the tubular inner member.

8. A vehicle occupant protection system comprising an airbag system including an airbag and a gas generating system according to claim 1 coupled to the airbag so as to enable fluid communication with the airbag upon activation of the airbag system.

9. The vehicle occupant protection system of claim 8 further comprising a crash event sensor in communication with a known crash sensor algorithm for signaling activation of the airbag system.

10. The vehicle occupant protection system of claim 8 further comprising a safety belt assembly including at least one safety belt.

11. The multiple chamber gas generating system of claim 1 wherein gases generated within the first chamber flow in the first axial direction and then in the second axial direction, and wherein gases generated within the second chamber flow in the second axial direction and then in the first axial direction.

12. A multi-chamber gas generating system comprising:
an elongated housing including a housing wall;
a divider secured within the interior of the housing to separate the interior of the housing into a first chamber and a second chamber, the divider forming a gas-tight barrier between the chambers;
at least one opening formed in the housing wall to enable fluid communication between the first chamber and an exterior of the housing;
at least one opening formed in the housing wall to enable fluid communication between the second chamber and the exterior of the housing;
a first sub-assembly positionable within the first chamber, the first sub-assembly including
a first tubular member having at least one opening formed therein to enable fluid communication between an interior of the first tubular member and the at least one opening formed in the housing wall enabling fluid communication between the first chamber and the housing exterior;
a second tubular member positioned within the first tubular member, the second tubular member including at least one opening formed therein to enable fluid communication between an interior of the second tubular member and the at least one opening formed in the first tubular member,
a tubular inner member positioned within the second tubular member, the inner tubular member including at least one opening formed therein to enable fluid communication between an interior of the inner tubular member and the at least one opening formed in the second tubular member;
a permeable gas cooling element positionable between the at least one second tubular member opening and the at least one first tubular member opening;
a gas generant composition positioned between the second tubular member and the inner tubular member;
an ignition compound positioned within the inner tubular member;

a second sub-assembly positionable within the second chamber, the second sub-assembly including a third tubular member positioned within the interior of the housing, the third tubular member having at least one opening formed therein to enable fluid communication between an interior of the third tubular member and the at least one opening formed in the housing wall enabling fluid communication between the second chamber and the housing exterior;

a fourth tubular member positioned within the third tubular member, the fourth tubular member including at least one opening formed therein to enable fluid communication between an interior of the fourth tubular member and the at least one opening formed in the third tubular member, another tubular inner member positioned within the fourth tubular member, the other inner tubular member including at least one opening formed therein to enable fluid communication between an interior of the other inner tubular member and the at least one opening formed in the fourth tubular member;

a permeable gas cooling element positionable between the at least one fourth tubular member opening and the at least one third tubular member opening;

a gas generant composition positioned between the fourth tubular member and the other inner tubular member;

an ignition compound positioned within the other inner tubular member;

the first sub-assembly having a first orientation with respect to the divider, the second sub-assembly having a second orientation with respect to the divider, the second orientation being inverted, with respect to the divider, from the first orientation.

13. The gas generating system of claim 12 wherein the at least one housing wall opening enabling fluid communication between the first chamber and the housing exterior is axially displaced from the at least one opening in the first tubular member such that combustion products flow in a first axial direction between the at least one opening in the first tubular member and the at least one housing wall opening enabling fluid communication between the first chamber and the housing exterior;

the at least one opening in the first tubular member is axially displaced from the at least one opening in the second tubular member such that combustion products flow in a second axial direction between the at least one opening in the second tubular member and the at least one opening in the first tubular member;

the at least one housing wall opening enabling fluid communication between the second chamber and the housing exterior is axially displaced from the at least one opening in the third tubular member such that combustion products flow in the second axial direction between the at least one opening in the third tubular member and the at least one housing wall opening enabling fluid communication between the second chamber and the housing exterior; and the at least one opening in the third tubular member is axially displaced from the at least one opening in the fourth tubular member such that combustion products flow in the first axial direction between the at least one opening in the fourth tubular member and the at least one opening in the third tubular member, the second axial direction being substantially opposite from the first axial direction.

14. A multiple chamber gas generating system comprising:

a first subassembly containing a first tubular member, a second tubular member positioned within said first tubular member, a first propellant chamber within the second tubular member, and a first initiator assembly in operable communication with said first propellant chamber for initiating combustion of a gas generant positioned within said first propellant chamber, said gas generating system also including a second subassembly containing a third tubular member, a fourth tubular member positioned within said third tubular member, a second propellant chamber within the fourth tubular member, and a second initiator assembly in operable communication with said second propellant chamber for initiating combustion of a gas generant positioned within said second propellant chamber, wherein said first and second tubular members combine to produce axial flow of gases initially in one of a first direction and a second direction substantially opposite the first direction, and subsequently in the other one of the first direction and the second direction, upon activation of said first propellant chamber, wherein said third and fourth tubular members combine to produce axial flow of eases initially in one of the first direction and the second direction, and subsequently in the other one of the first direction and the second direction, upon activation of said second propellant chamber, and wherein said first and second subassemblies are substantially identical in design and are coaxially positioned within said gas generating system.

15. The multiple chamber gas generating system of claim 14 further comprising a first cooling element located radially outwardly of said first propellant chamber.

16. The multiple chamber gas generating system of claim 15 wherein said first cooling element is a baffle assembly formed by a plurality of concentric tubular members.

17. The multiple chamber gas generating system of claim 15 further comprising a second cooling element located radially outwardly of said second propellant chamber.

* * * * *